(12) United States Patent
Bobrov

(10) Patent No.: US 11,385,876 B1
(45) Date of Patent: Jul. 12, 2022

(54) INFRASTRUCTURE CONTROL INTERFACE FOR DATABASE SYSTEMS

(71) Applicant: salesforce.com, inc., San Francisco, CA (US)

(72) Inventor: Vadim Bobrov, Wayland, MA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/301,412

(22) Filed: Apr. 1, 2021

(51) Int. Cl.
*G06F 9/45* (2006.01)
*G06F 8/41* (2018.01)
*G06F 8/30* (2018.01)

(52) U.S. Cl.
CPC .............. *G06F 8/447* (2013.01); *G06F 8/315* (2013.01); *G06F 8/37* (2013.01); *G06F 8/427* (2013.01)

(58) Field of Classification Search
CPC . G06F 8/447; G06F 8/315; G06F 8/37; G06F 8/427
USPC ........................................................ 717/140
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |

(Continued)

OTHER PUBLICATIONS

Title: Highly-Optimizing and Multi-Target Compiler for Embedded System Models: C++ Compiler Toolchain for the Component and Connector Language , author: E Kusmenko,, published on 2018.*

(Continued)

*Primary Examiner* — Chameli Das
(74) *Attorney, Agent, or Firm* — LKGlobal | Lorenz & Kopf, LLP

(57) ABSTRACT

Database systems and methods are provided for remotely managing an infrastructure component. One method involves an ICL compiler service obtaining a plain text command from a client device coupled to a network, parsing the plain text command to identify an infrastructure target of the plain text command and a portion defining an action for the infrastructure target, compiling the portion of the plain text command defining the action into an intermediate format encapsulated in an executable object, and providing the executable object to the infrastructure target.

16 Claims, 5 Drawing Sheets

(56) References Cited

U.S. PATENT DOCUMENTS

| | | | |
|---|---|---|---|
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,183,020 B1 * | 11/2015 | de Icaza | G06F 8/447 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2006/0130016 A1 * | 6/2006 | Wagner | G06F 9/4812 717/136 |
| 2008/0249972 A1 | 10/2008 | Dillon | |
| 2009/0063414 A1 | 3/2009 | White et al. | |
| 2009/0100342 A1 | 4/2009 | Jakobsen | |
| 2009/0177744 A1 | 7/2009 | Marlow et al. | |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2012/0308969 A1 * | 12/2012 | Rataul | G05B 19/41865 434/224 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0007041 A1 * | 1/2014 | Schmeling | G06F 8/35 717/104 |
| 2017/0075668 A1 * | 3/2017 | Selvi | G06F 8/42 |
| 2017/0364337 A1 * | 12/2017 | Glendenning | G06F 30/30 |
| 2020/0110377 A1 * | 4/2020 | Chatterjee | F24F 11/63 |
| 2020/0159536 A1 * | 5/2020 | Saidi | G06F 8/71 |
| 2020/0192646 A1 * | 6/2020 | Yerramreddy | G06F 8/10 |
| 2020/0250260 A1 * | 8/2020 | Portisch | G06F 40/103 |

OTHER PUBLICATIONS

Title: Multi-language, multi-target compiler development: Evolution of the Gardens Point compiler project, author: KJ Gough, published on 1997.*

Ice: Binary analysis that you can see D Pucsek, 2013.*

Deriving correctness properties of compiled code, P Curzon, 1993.*

(56) References Cited

OTHER PUBLICATIONS

Title: Clearwater: extensible, flexible, modular code generation; autho: GS Swint; Published on 2005.*

* cited by examiner

300

```
execute
    copy(filename)
    alerts(off) ->
    availableUpdates = checkUpdates() ->
    if availableUpdates
        downloadUpdates(availableUpdates) ->
        applyUpdates ->
        reboot
    endif ->
    alerts(on)
on
  server is hostA or server is hostB
```

```
class ExecuteCommand {

List<String> hosts = List.of( "hostA", "hostB" );
    ExecuteStream first = List.of( Step.of("copy", "filename") );
    ExecuteStream second = List.of(
            Step.of("alerts", "off"),
            AssignStep.of("availableUpdates", "checkUpdates"),
            IfStep.of("availableUpdate", List.of(
                    UseStep.of("downloadUpdates", "availableUpdates"),
                    Step.of("applyUpdates"),
                    Step.of("reboot")
            )),
            Step.of("alerts", "on")
        )
}
```

INFRASTRUCTURE CONTROL INTERFACE FOR DATABASE SYSTEMS

TECHNICAL FIELD

One or more implementations relate to the field of database systems, and more specifically, to remotely interfacing with infrastructure management tools.

BACKGROUND

Modern software development has evolved towards web applications and cloud-based applications that provide access to data and services via the Internet or other networks. Modern cloud computing systems may include hundreds or thousands of servers, databases, and/or other infrastructure components, which complicates maintenance and system administration. While various orchestration tools or other administrative tools exist to assist with system administration, configuring those tools across a cloud computing system remains cumbersome and manually intensive. Accordingly, it is desirable to facilitate system administration in a more user-friendly manner.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3 depicts an exemplary plain text infrastructure control language command source code suitable for submission to an infrastructure control language compiler service over a network using a graphical user interface (GUI) display presented by a client application in the computing system of FIG. 1 in connection with the infrastructure control process of FIG. 2 according to some example implementations;

FIG. 4 depicts an exemplary compiled assembly code representation of the plain text infrastructure control language command source code that may be automatically generated by the infrastructure control language compiler service in connection with the infrastructure control process of FIG. 2 according to some example implementations;

DETAILED DESCRIPTION

Figure 1:
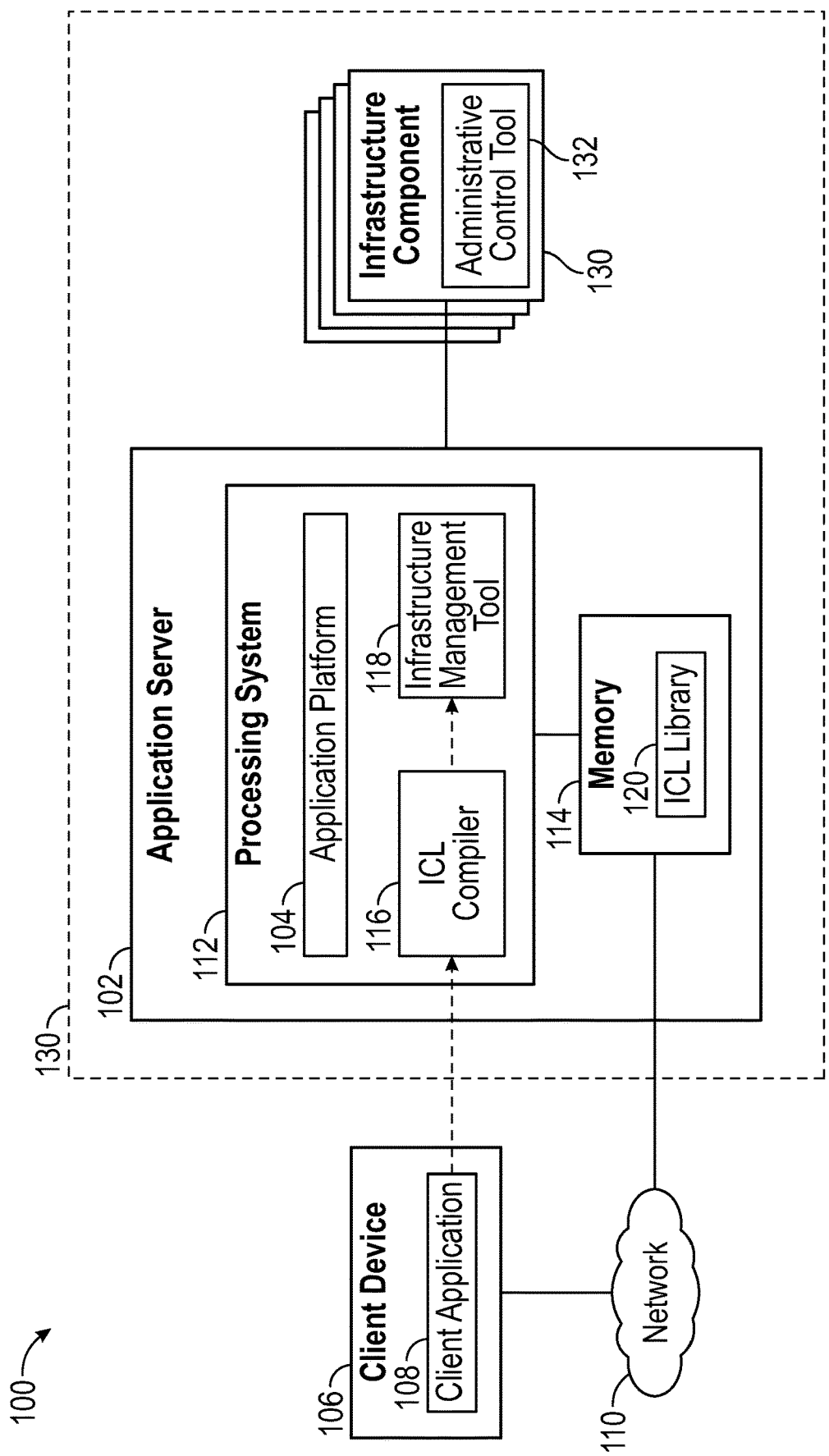
FIG. 1 is a block diagram illustrating a computing system according to some example implementations.

The subject matter described herein generally relates to an infrastructure control language (ICL) and user interface that allow a system administrator to remotely and programmatically interface with existing orchestration tools or other infrastructure management tools to manage and orchestrate changes to the computing system infrastructure and/or perform maintenance with respect to infrastructure components, such as, for example, adding or removing services, applying software updates, relocating files and/or the like. Unlike alternative approaches that may require certain preconditions to be met (e.g., Secure Shell (SSH) connectivity) or installation of third-party software agents, the subject matter described herein provides a user-friendly and customizable way to integrate with existing enterprise tooling without compromising accountability or auditability. In this regard, the ICL described herein is a highly customizable language that allows a user to specify what action is to be done ("what"), the target infrastructure where the action is to be done ("where"), and the options or configurations the user would like to utilize when executing the action ("how"), with the entire ICL command capable of being saved as a document or audit record for traceability. Additionally, the ICL can be implemented with a compiler that utilizes a self-contained library that can be integrated with existing tooling and does not require connectivity preconditions, any specific execution engine, or other third-party tooling.

In exemplary implementations, the ICL command is provided as plain text that defines the action to be performed ("execution specification"), the infrastructure component(s) that are the subject of the command ("target selection"), and the desired options, settings, or other configuration details for the action that the user would like to be applied at the destination infrastructure management tool or orchestration tool that will be executing the action ("configuration specification"). The target selection portion of the ICL is declarative and allows the user to specify the targeted infrastructure component(s), which could include one or more server(s), computer(s), application(s) or other infrastructure target(s) (e.g., any subset of infrastructure such as allow/deny lists, staging/production environments, and the like). In this regard, the ICL allows combinations of different infrastructure components to be utilized as targets for the action using nested Boolean logic (e.g., AND, OR, NOT, etc.) and nested parenthesis. The execution specification portion of the ICL command is imperative and allows the user to specify both sequential and parallel steps and conditional execution while leaving the interpretation and resulting step definition to the existing destination infrastructure management tool or orchestration tool that will be executing the action in accordance with the configuration specification. In this regard, the configuration specification portion of the ICL may include any necessary configuration information that must be passed to the execution engine at the destination infrastructure management tool for executing the desired action.

As described in greater detail below, in exemplary implementations, an ICL compiler receives a plain text command input by a user at a client device and parses the plain text command utilizing the ICL library to identify the target selection portion of the command defining the infrastructure target for executing the ICL command, the execution specification portion of the command defining an action for the infrastructure target to execute, and the configuration specification portion of the command defining the desired user configuration for the action. The ICL compiler utilizes the ICL library to compile the execution specification and configuration specification portions of the command into an intermediate format that is encapsulated in an executable object, such as, for example, a JavaScript Object Notation (JSON) file, an Extensible Markup Language (XML) file, a Python file object, a Go file object, or the like. In one or more implementations, the intermediate format is realized as an assembly language or other machine-readable or computer-readable format that does not require parsing or interpretation for conversion into binary or machine code. The declaratively identified infrastructure target(s) is utilized to transmit or otherwise route the executable object to the appropriate infrastructure target(s) over a network.

In one or more implementations, the ICL compiler provides the executable object to an infrastructure management tool associated with the infrastructure target(s), which analyzes the compiled version of the ICL command in the intermediate assembly language format to determine which action(s) should be performed, which infrastructure target(s) are the intended destination(s) for performance of those the action(s), and which orchestration tool(s) or infrastructure management tool(s) associated with the infrastructure target(s) should receive and execute the ICL command. In some implementations, the infrastructure management tool routes, transmits, or otherwise provides the executable object to the appropriate destination tool, which, in turn, utilizes the intermediate format of the execution and configuration specifications provided in the compiled version of the ICL command to automatically determine how to execute the specified action in accordance with the specified configuration and automatically execute the desired infrastructure control action. That said, in other embodiments, the infrastructure management tool may translate the representation of the ICL command in the intermediate assembly language format into corresponding commands or instructions in machine code or another format that is executable by the targeted orchestration tool(s) or infrastructure management tool(s) before providing the reformatted commands or instructions to the targeted tool(s) for execution.

FIG. 1 depicts an exemplary system 100 that supports remotely interfacing with infrastructure tools to perform maintenance or administrative actions with respect to one or more infrastructure components over a network. It should be appreciated that FIG. 1 depicts a simplified representation of the system 100 for purposes of explanation and is not intended to be limiting.

In exemplary implementations, the system 100 includes a server 102 capable of receiving, over a communications network 110, plain text ICL commands from a client application 108 executed on a client device 106 or another graphical user interface (GUI) provided at the client device 106 (e.g., a command line GUI display). The client device 106 is communicatively coupled to the server 102 via a communications network 110, such as the Internet or any sort or combination of wired and/or wireless computer network, a cellular network, a mobile broadband network, a radio network, or the like. In one or more implementations, the server 102 includes or otherwise supports an application platform 104 configurable to provide instances of a web application within a web browser or other client application 108 at a client device 106, for example, by generating an instance of a virtual application at run-time or on-demand. Accordingly, for purposes of explanation but without limitation, the server 102 may alternatively be referred to herein as an application server.

The application server 102 generally represents a server computing device, server computing system or another combination of processing logic, circuitry, hardware, and/or other components configured to support the processes, tasks, operations, and/or functions described herein. In this regard, the application server 102 generally includes a processing system 112, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system 112 may include or otherwise access a data storage element 114 (or memory) capable of storing programming instructions for execution by the processing system, that, when read and executed, are configurable cause processing system to create, generate, or otherwise facilitate an application platform 104 that generates or otherwise provides instances of a web application at run-time (or "on-demand") based at least in part upon code and other data that is stored or otherwise maintained by the memory 114, a database, or another location on the network 110 and support the subject matter described herein. Depending on the implementation, the memory 114 may be realized as a random access memory (RAM), read only memory (ROM), flash memory, magnetic or optical mass storage, or any other suitable non-transitory short or long term data storage or other computer-readable media, and/or any suitable combination thereof.

In exemplary implementations, the memory 114 stores programming instructions that, when executed by the processing system 112, are configurable to cause the processing system 112 to create, generate, or otherwise facilitate ICL compiler 116 and one or more infrastructure management tools 118 cooperatively configured to support the subject matter described herein. In this regard, although FIG. 1 depicts the ICL compiler 116 and the infrastructure management tool(s) 118 as separate or distinct components, in practice, the ICL compiler 116 may be integrated, incorporated, or otherwise combined with the infrastructure management tool(s) 118 (e.g., as a plug-in or add-in to existing software). As described in greater detail below, the ICL compiler 116 is configurable to provide an interface that allows a human user of the client device 106 to remotely and programmatically communicate with the infrastructure management tool(s) 118 using plain text ICL commands. To support the ICL compiler 116, the memory 114 may store or otherwise maintain an ICL library 120 that is utilized by the ICL compiler 116 to parse a received plain text ICL command and convert or otherwise translate the ICL command into a format that is executable by the infrastructure management tool(s) 118.

The plain text ICL command includes a target selection portion that identifies the infrastructure components within the system 100 that are the intended target or destination for executing, implementing, or otherwise performing the commanded action(s) specified within the plain text ICL command. In some implementations, the target selection portion may identify, for use as the infrastructure target, one or more infrastructure components 130 that are communicatively coupled to the application server 102 and effectively reside behind the application server 102 and/or the infrastructure management tool 118. In this regard, depending on the implementation, the target infrastructure component 130 may be realized as another server computing device (e.g., a web server, a proxy server, an application server, etc.), a database, a router, a storage unit, a file or another resource associated with the system 100 that is capable of receiving a command or executing a commanded action. In such implementations, the infrastructure management tool 118 may be configurable to communicate or otherwise interface with an administrative control tool 132 that resides on the targeted infrastructure component 130 or is otherwise associated with the targeted infrastructure component 130. For example, the infrastructure components 130 may be communicatively coupled to the application server 102 and/or the infrastructure management tool 118 over a local area network (LAN), a virtual private network (VPN), or the like that is physically and/or logically distinct from the network 110. That said, in some implementations, the infrastructure components 130 may communicate with the application server 102 and/or the infrastructure management tool 118 over the same network 110 utilized to communicate with the client device 106. The administrative control tool 132 may be realized as any sort of orchestration software, scheduling software, or other software control tool that is capable of performing automated actions with respect to the configuration or operation of the infrastructure component 130. That said, in other scenarios, the ICL command may identify the application server 102 as the desired infrastructure target for the ICL command, whereby the infrastructure management tool 118 may be configurable to automatically perform the commanded action(s) with respect to the configuration or operation of the application server 102, the application platform 104, the processing system 112 and/or the memory 114.

The client device 106 generally represents an electronic device coupled to the network 110 that may be utilized by a user to submit plain text ICL commands to the ICL compiler 116 at the application server 102 over the network 110. In practice, the client device 106 can be realized as any sort of personal computer, mobile telephone, tablet or other network-enabled electronic device. In exemplary implementations, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106. The illustrated client device 106 executes or otherwise supports a client application 108 that communicates with the application server 102 using a networking protocol. In some implementations, the client application 108 is realized as a web browser or similar local client application executed by the client device 106 that contacts the application server 102 using a networking protocol, such as the hypertext transport protocol (HTTP). In this regard, in one or more implementations, the client application 108 may be utilized to access or otherwise initiate an instance of a web application provided by the application platform 104, where the web application provides an infrastructure control web page graphical user interface (GUI) display within the client application 108 that includes GUI elements for receiving a plain text ICL command from a user of the client device 106. That said, in other implementations, a user may utilize a command line interface or a script executing at the client device 106 to input or otherwise provide the plain text ICL command that is transmitted from the client device 106 to the ICL compiler 116 at the application server 102.

Still referring to FIG. 1, in one or more implementations, the application server 102 and the infrastructure components 130 are cooperatively configured as an on-demand multi-tenant database system that is capable of dynamically creating and supporting virtual applications based upon data from a common resource database (e.g., one of the infrastructure components 130 behind the application server 102) that is shared between multiple tenants, which may alternatively be referred to herein as a multi-tenant database. Data and services generated by the virtual applications may be provided via the network 110 to any number of client devices, as desired. Each virtual application may be suitably generated at run-time (or on-demand) using a common application platform that securely provides access to the data in the database for each of the various tenants subscribing to the multi-tenant system. In accordance with one non-limiting example, the application server 102 and infrastructure components 130 may be implemented in the form of an on-demand multi-tenant customer relationship management (CRM) system that can support any number of authenticated users of multiple tenants. That said, it should be appreciated the subject matter described herein is not necessarily limited to CRM systems, on-demand database systems, multi-tenant database systems, or any other particular configuration.

Figure 2:
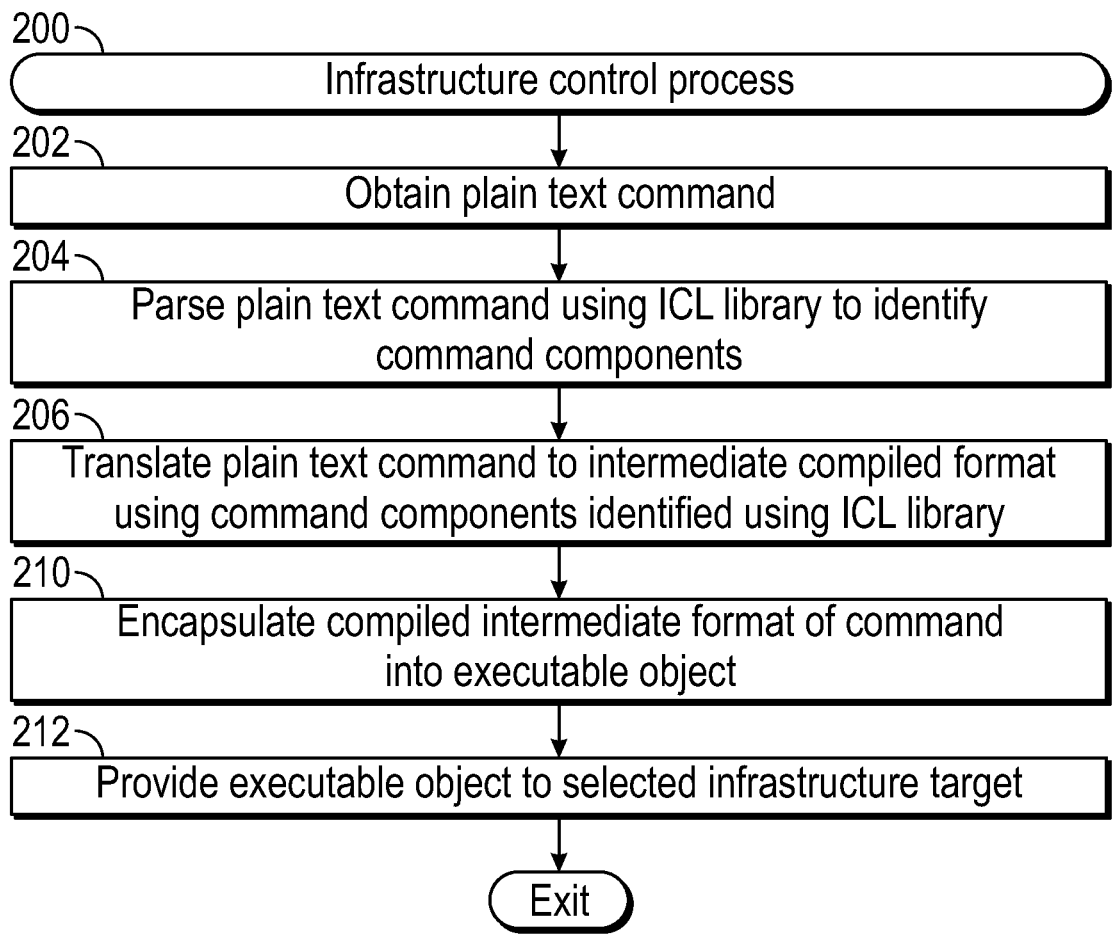
FIG. 2 is a flow diagram illustrating an infrastructure control process suitable for use with the computing system according to some example implementations.

FIG. 2 depicts an exemplary infrastructure control process 200 that may be implemented or otherwise performed by a computing system to enable a user to remotely and programmatically interface with infrastructure components and perform additional tasks, functions, and/or operations described herein. For illustrative purposes, the following description may refer to elements mentioned above in connection with FIG. 1. In this regard, while portions of the infrastructure control process 200 may be performed by different elements of the computing system 100, for purposes of explanation, the subject matter is described herein in the context of the infrastructure control process 200 being primarily performed by the application server 102, the ICL compiler 116 and/or the infrastructure management tool 118. It should be appreciated that the infrastructure control process 200 may include any number of additional or alternative tasks, the tasks need not be performed in the illustrated order and/or the tasks may be performed concurrently, and/or the infrastructure control process 200 may be incorporated into a more comprehensive procedure or process having additional functionality not described in detail herein. Moreover, one or more of the tasks shown and described in the context of FIG. 2 could be omitted from a practical implementation of the infrastructure control process 200 as long as the intended overall functionality remains intact.

The illustrated infrastructure control process 200 initializes or otherwise begins by receiving or otherwise obtaining a plain text command from a client device over a network (task 202). For example, as described above, an administrator user may utilize a web browser or similar client application 108 at a client device 106 to access a web page GUI display provided by the application server 102 to input a plain text ICL command and transmit or otherwise submit the plain text command to the ICL compiler 116 for implementation.

The infrastructure control process 200 continues by parsing or otherwise analyzing the plain text command to identify different components of the plain text command using an infrastructure control language library (task 204). The different components of the plain text command are then utilized to translate or otherwise convert the plain text command into a different format using the infrastructure control language library (task 206). For example, as described above, in response to receiving a plain text ICL command from a client device 106 over the network 110, the ICL compiler 116 may utilize the ICL library 120 to identify the various different methods, objects, properties, delimiters and/or the like that are specified within the plain text ICL command. In exemplary implementations, the ICL compiler 116 identifies an execution specification component of the plain text ICL command that recites the method(s) or action(s) to be performed in connection with the ICL command, a target selection component of the plain text ICL command that identifies the targeted infrastructure component(s) where the identified method(s) or action(s) are to be performed, and a configuration specification component of the plain text ICL command that identifies the desired properties, attributes, options, settings, or other configuration details for the method(s) or action(s). The ICL compiler 116 utilizes the ICL library 120 to map or otherwise convert the plain text ICL command into an intermediate compiled format that recites the execution specification, the target selection, and the configuration specification components in an intermediate format that can be read and executed by the infrastructure management tool 118 without parsing or interpretation. For example, in one implementation, the ICL compiler 116 automatically translates the plain text ICL command that is written using the ICL command language into lower level code in an assembly language that is more readily executable by the infrastructure management tool 118.

After translating the plain text command into a compiled intermediate format, the infrastructure control process 200 encapsulates or otherwise packages the compiled intermediate format of the infrastructure control command into an executable object and transmits or otherwise provides the executable object to the selected infrastructure target(s) that were identified in the plain text infrastructure control command (tasks 208, 210). For example, in one implementation, after translating the plain text ICL command from ICL command language into lower level assembly code, the ICL compiler 116 encapsulates the assembly code in a class object or other executable object that is transmitted or otherwise provided to the infrastructure management tool 118 for execution (e.g., via an application programming interface (API) associated with the infrastructure management tool 118). The infrastructure management tool 118 executes or otherwise processes the executable object to perform the specified method(s) or action(s) with the properties, attributes, options, settings, or other configuration details provided by the user at the application server 102 or another infrastructure component 130. In this regard, when the ICL command identifies one or more infrastructure components 130 behind the application server 102 as the desired infrastructure targets for the ICL command action(s), the infrastructure management tool 118 configures or otherwise communicates with the appropriate administrative control tool(s) 132 at the identified infrastructure component(s) 130 (e.g., via an application programming interface (API) associated with the administrative control tool(s) 132) to initiate the commanded action(s) at those targeted infrastructure component(s) 130. In some implementations, the ICL compiler 116 also creates a document, file, or other audit record in the memory 114 that maintains the received plain text ICL command and the corresponding translation provided to the infrastructure management tool 118 for traceability and/or other retrospective analysis.

For example, referring now to FIGS. 3-4, in one implementation, the infrastructure management tool 118 may be configurable to support the following functionalities via an API associated with the infrastructure management tool 118: copying files, rebooting servers, enabling or disabling alerting, checking for software updates, downloading software updates, and applying software updates. An administrator user may desire to perform the following sequence of actions to perform maintenance on a subset of servers 130 that reside behind the application server 102 using the infrastructure management tool 118: disabling alerting so that alerts do not trigger when the servers 130 reboot, checking for software updates, downloading and applying software updates if software updates are available, copying files concurrently to any software updating, rebooting the servers 130 after software updating, and enabling alerting after rebooting the servers 130. Rather than requiring the administrator user to possess the requisite computer programming skill and understanding of the logic and concurrency features of the API associated with the infrastructure management tool 118, the administrator user may utilize the ICL language to input or otherwise provide the plain text ICL command source code 300 depicted in FIG. 3 that specifies the desired sequence of maintenance actions to be performed on the desired subset of servers 130 (e.g., servers named "hostA" and "hostB") that reside behind the application server 102. As shown, the ICL language allows the administrator user to imperatively specify the sequential, parallel, and/or conditional actions to be performed along with any desired configurations for those actions and declaratively identify the servers for where those actions are to be performed.

As illustrated in FIG. 4, the ICL compiler 116 parses the plain text ICL command 300 to identify the target selection component 320 identifying the infrastructure targets (hostA and hostB) for the plain text ICL command 300 and the execution specification component 310 of the plain text ICL command 300 and automatically compiles and translates the plain text ICL command 300 into an intermediate assembly language code format 400 that is encapsulated in a JAVA class object ("ExecuteCommand"). For example, the declarative target selection portion 320 of the plain text ICL command 300 ("on server is hostA or server is hostB") may be parsed and interpreted to identify the only infrastructure targets capable of a satisfying the condition expressed therein, and then translated into a conditional line of assembly code that functions as a prerequisite to limit execution of the class object to the specified infrastructure targets capable of satisfying the condition ("List<string> hosts=List.of ("hostA", "hostB")"). In this regard, the ICL compiler 116 configures the target selection conditional to include or otherwise encompass the translations of the execution specification and configuration portions of the plain text ICL command. For those portions of the plain text ICL command within the target selection conditional, the ICL compiler 116 utilizes the ICL library 120 to map methods or actions specified within the execution specification component 310 of the plain text ICL command source code 300 into corresponding methods or actions in the assembly language or other intermediate format supported by the API associated with the infrastructure management tool 118, with the methods and/or actions being sequenced or arranged within the assembly code 400 to provide the desired conditionality, concurrency and/or logical relationships between actions.

The ICL compiler 116 transmits or otherwise provides the JAVA class object containing the assembly code 400 to the API of the infrastructure management tool 118. The infrastructure management tool 118 receives the executable JAVA class object and executes the assembly code representation of the ICL command to perform the actions specified by the ICL command on the identified infrastructure targets in accordance with the configuration parameters or attributes defined within the assembly code. For example, the infrastructure management tool 118 may identify the hostA and hostB servers as the infrastructure components 130 where actions are to be performed and then transmits or otherwise provides corresponding instructions or commands for performing those actions to the instances of the administrative control tool 132 on the hostA and hostB servers 130. In this regard, the infrastructure management tool 118 may translate the assembly code representation of the ICL command into machine code or another format that is executable by the administrative control tool 132 on the hostA and hostB servers 130, which, in turn, executes the machine code representation of the ICL command to perform the actions. By virtue of the execution specification portion of the ICL being imperative, the ICL and the infrastructure control process 200 allow the user to specify a particular sequence of commands to be executed in a particular order subject to particular conditions while eliminating any uncertainty and obviating interpretation by directing the ICL compiler 116 and/or infrastructure management tool 118 what actions to perform, thereby improving performance and ensuring the desired result is achieved.

Referring to FIGS. 1-4, in exemplary implementations, the ICL library 120 is configurable to allow a user to specify any number of different infrastructure targets, as well as any number of different configurations or conditions for the actions to be performed, including, but not limited to, sequential execution, parallel execution, conditional execution, and/or the like. In this regard, the ICL library 120 supports Boolean operators and logic, including nested Boolean logic, to identify different combinations of infrastructure components to be utilized as infrastructure targets and different combinations of actions or methods to be performed in connection with those infrastructure targets. Additionally, in some implementations, the ICL compiler 116 and/or the ICL library 120 are configurable to support different intermediate formats and/or different types of executable objects to be provided to the infrastructure management tool 118 and/or the administrative control tool(s) 132 for execution, including, but not limited to, a JSON class file or object, an XML file, a Python file object, a Go file object, and/or the like. By virtue of the ICL compiler 116 translating the plain text ICL command into a compiled intermediate format encapsulated or contained in an executable object, the ICL command is executable upon receipt by infrastructure management tool 118 and/or the administrative control tool(s) 132 without requiring additional compilation at the destination tool.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
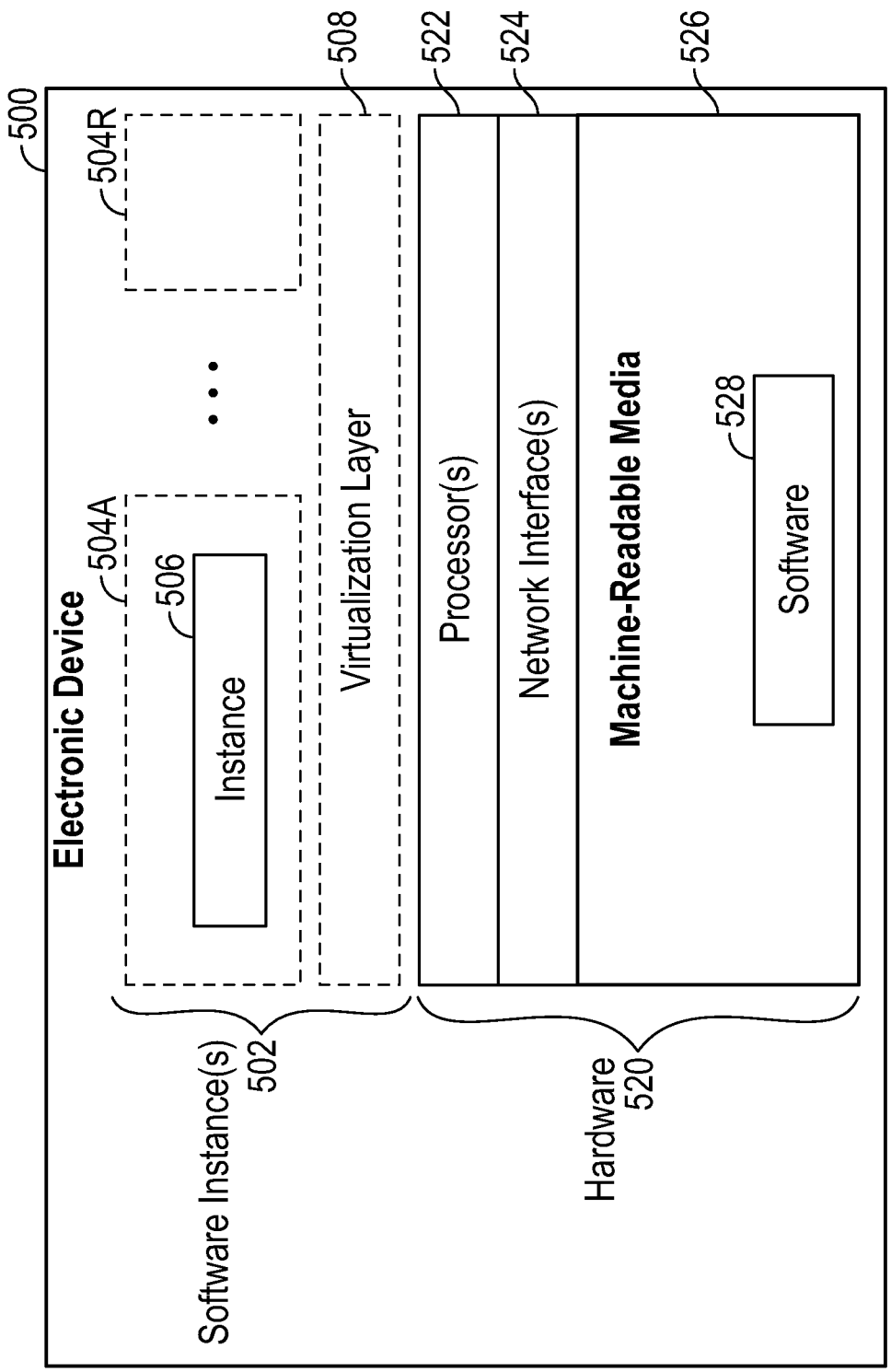
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients and the ICL compiler service may be implemented in one or more electronic devices 500. In one implementation: 1) each of the clients is implemented in a separate one of the electronic devices 500 (e.g., in end user devices where the software 528 represents the software to implement clients to interface directly and/or indirectly with the ICL compiler service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the ICL compiler service is implemented in a separate set of one or more of the electronic devices 500 (e.g., a set of one or more server devices where the software 528 represents the software to implement the ICL compiler service); and 3) in operation, the electronic devices implementing the clients and the ICL compiler service would be communicatively coupled (e.g., by a network) and would establish between them (or through one or more other layers and/or or other services) connections for submitting plain text ICL commands to the ICL compiler service. Other configurations of electronic devices may be used in other implementations (e.g., an implementation in which the client and the ICL compiler service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Figure 5B:
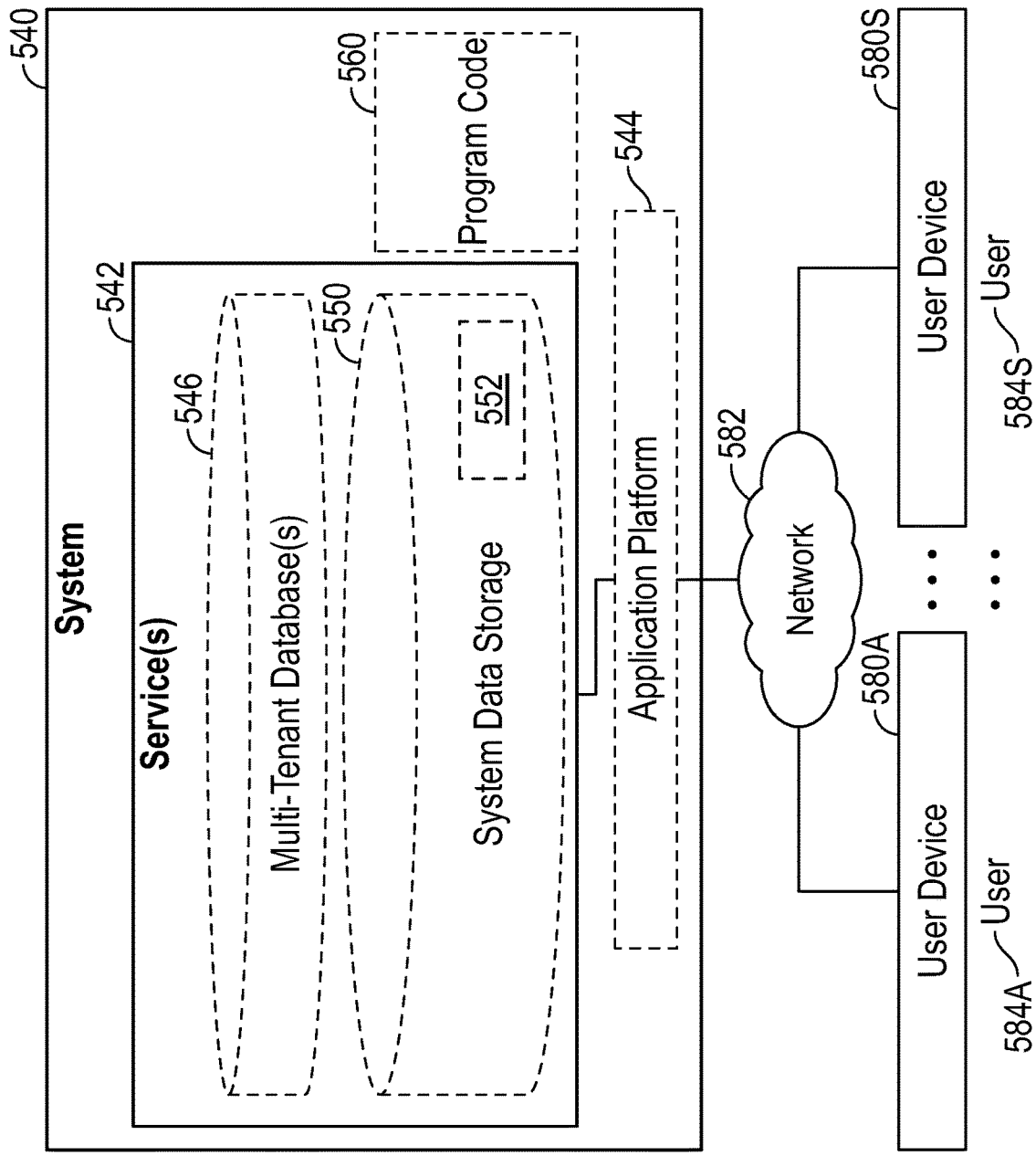
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the ICL compiler service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 540 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the ICL compiler service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $6^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A non-transitory machine-readable storage medium that provides instructions that, when executed by a processor, are configurable to cause said processor to perform operations comprising:
    obtaining plain text from a client device coupled to a network, wherein the plain text includes an execution specification portion defining a sequence of actions to be performed and a target selection portion defining an infrastructure target for the sequence of actions, wherein the execution specification portion is imperative and specifies the sequence of actions to be executed in a particular order;
    parsing the plain text to identify the infrastructure target of the plain text and the execution specification portion defining the sequence of actions for the infrastructure target;
    compiling the execution specification portion of the plain text into an intermediate format encapsulated in an executable object by mapping each respective action of the sequence of actions to a corresponding assembly language code format arranged within assembly code in accordance with the sequence, wherein the intermediate format is executable by an infrastructure management tool; and
    providing the executable object to the infrastructure management tool, wherein the infrastructure management tool executes the intermediate format of the execution specification portion to perform the sequence of actions at the infrastructure target.

2. The non-transitory machine-readable storage medium of claim 1, wherein the instructions are configurable to cause said processor to compile the execution specification portion of the plain text by translating the execution specification portion of the plain text to an intermediate code representation encapsulated in a class file.

3. The non-transitory machine-readable storage medium of claim 1, wherein the instructions are configurable to cause said processor to provide an infrastructure control web page graphical user interface (GUI) display at the client device over the network, wherein the infrastructure control web page GUI display is configurable to obtain the plain text.

4. The non-transitory machine-readable storage medium of claim 1, wherein the instructions are configurable to cause said processor to provide an infrastructure control language (ICL) compiler service configurable to receive the plain text from the client device over the network and compile the plain text by translating the plain text to an intermediate code representation encapsulated in the executable object using an ICL library.

5. The non-transitory machine-readable storage medium of claim 1, wherein the executable object comprises the execution specification portion in a compiled intermediate format executable upon receipt by the infrastructure management tool without parsing, interpretation or additional compilation.

6. The non-transitory machine-readable storage medium of claim 1, wherein the sequence of actions comprises at least one of copying files, rebooting servers, enabling alerting, disabling alerting, checking for software updates, downloading software updates, and applying software updates.

7. The non-transitory machine-readable storage medium of claim 1, wherein the infrastructure target comprises an infrastructure component that resides behind an application server comprising the infrastructure management tool.

8. The non-transitory machine-readable storage medium of claim 7, wherein the infrastructure management tool configures an administrative control tool that resides on the infrastructure component to initiate the sequence of actions at the infrastructure component.

9. The non-transitory machine-readable storage medium of claim 1, wherein the infrastructure target comprises a web server, a proxy server, an application server, a database, a router, a storage unit or a file.

10. A computing system comprising:
a non-transitory machine-readable storage medium that stores software; and
a processor, coupled to the non-transitory machine-readable storage medium, to execute the software that implements an infrastructure control language (ICL) compiler service and that is configurable to:
obtain a plain text command from a client device coupled to a network, wherein the plain text command includes an execution specification portion defining a sequence of actions to be performed and a target selection portion defining an infrastructure target for the sequence of actions, wherein the execution specification portion is imperative and specifies the sequence of actions to be executed in a particular order;
parse the plain text command to identify the infrastructure target of the plain text command and the execution specification portion defining the sequence of actions for the infrastructure target;
compile the execution specification portion of the plain text command into a format encapsulated in an executable object by mapping each respective action of the sequence of actions to a corresponding assembly language code format arranged within assembly code in accordance with the sequence, wherein the format is executable by an infrastructure management tool; and
provide the executable object to the infrastructure management tool, wherein the infrastructure management tool executes the format of the execution specification portion to perform the sequence of actions at the infrastructure target.

11. The computing system of claim 10, wherein the software is configurable to compile the execution specification portion of the plain text command by translating the plain text command to an assembly code representation of the execution specification portion encapsulated in a class file.

12. The computing system of claim 11, wherein the software is configurable to parse the plain text command to identify the infrastructure target and the execution specification portion defining the sequence of actions for the infrastructure target using an ICL library stored at the non-transitory machine-readable storage medium and translate the plain text command to the assembly code representation using the ICL library.

13. The computing system of claim 10, wherein the software is configurable to provide an infrastructure control web page graphical user interface (GUI) display at the client device over the network, wherein the infrastructure control web page GUI display is configurable to obtain the plain text command.

14. The computing system of claim 10, wherein the executable object comprises a JavaScript Object Notation (JSON) file, an Extensible Markup Language (XML) file, a PYTHON file object or a Go file object.

15. A method of performing managing an infrastructure component of a computing system, the method comprising:
obtaining, by an infrastructure control language (ICL) compiler service, a plain text command from a client device coupled to a network, wherein the plain text command includes an execution specification portion defining a sequence of actions to be performed and a target selection portion defining the infrastructure component of the computing system for the sequence of actions, wherein the execution specification portion is imperative and specifies the sequence of actions to be executed in a particular order;
parsing, by the ICL compiler service, the plain text command to identify the infrastructure component as a target of the plain text command and the execution specification portion defining the sequence of actions for the target;
compiling, by the ICL compiler service, the execution specification portion of the plain text command into a format encapsulated in an executable object by mapping each respective action of the sequence of actions to a corresponding assembly language code format arranged within assembly code in accordance with the sequence, wherein the format is executable by an infrastructure management tool; and
providing the executable object to the infrastructure management tool, wherein the infrastructure management tool executes the format of the execution specification portion to perform the sequence of actions at the infrastructure component identified as the target of the plain text command.

16. The method of claim 15, further comprising providing, by the ICL compiler service, an infrastructure control web page graphical user interface (GUI) display configurable to obtain the plain text command at the client device over the network, wherein the ICL compiler service receives the plain text command from the infrastructure control web page GUI display over the network.

* * * * *